(12) United States Patent
Perna

(10) Patent No.: US 8,866,089 B2
(45) Date of Patent: Oct. 21, 2014

(54) SCINTILLATOR PIXEL ARRAY (71) Applicant: Louis Perna, Elyria, OH (US)

(72) Inventor: Louis Perna, Elyria, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 146 days.

(21) Appl. No.: 13/712,360

(22) Filed: Dec. 12, 2012

(65) Prior Publication Data
US 2013/0200266 A1 Aug. 8, 2013

Related U.S. Application Data
(60) Provisional application No. 61/582,222, filed on Dec. 30, 2011.

(51) Int. Cl.
G01J 5/02 (2006.01)
G01T 1/20 (2006.01)

(52) U.S. Cl.
CPC .............. G01T 1/20 (2013.01); G01T 1/2006 (2013.01)
USPC ........................................................ 250/366

(58) Field of Classification Search
CPC .................................... G01T 1/20; G01T 1/2006
USPC ........................................................ 250/366
See application file for complete search history.

(56) References Cited

U.S. PATENT DOCUMENTS

| | | | |
|---|---|---|---|
| 5,418,377 A * | 5/1995 | Tran et al. | 250/483.1 |
| 6,448,566 B1 | 9/2002 | Riedner et al. | |
| 6,717,174 B2 * | 4/2004 | Karellas | 250/582 |
| 6,921,909 B2 * | 7/2005 | Nagarkar et al. | 250/483.1 |
| 7,157,014 B1 * | 1/2007 | Andreaco et al. | 216/24 |
| 7,329,875 B2 | 2/2008 | McEvoy et al. | |
| 7,625,502 B2 | 12/2009 | Clothier et al. | |
| 7,708,968 B2 | 5/2010 | Clothier et al. | |
| 7,709,805 B2 * | 5/2010 | Burr | 250/370.11 |
| 2004/0156478 A1 | 8/2004 | Appleby et al. | |
| 2006/0108533 A1 | 5/2006 | McEvoy et al. | |
| 2008/0241040 A1 | 10/2008 | Clothier et al. | |
| 2008/0241041 A1 | 10/2008 | Clothier et al. | |
| 2010/0127180 A1 | 5/2010 | Lifshitz et al. | |
| 2010/0276600 A1 | 11/2010 | Ronda et al. | |
| 2011/0024685 A1 | 2/2011 | Clothier et al. | |

FOREIGN PATENT DOCUMENTS

WO 2009060349 A2 5/2009

OTHER PUBLICATIONS

Bauer et al., "Depth of Interaction with a 3-dimensional checkerboard arrangement LSO-LSO block," Jun. 2010, IEEE Transactions on Nuclear Science, vol. 57, No. 3, pp. 971-975.*

* cited by examiner

Primary Examiner — Kiho Kim
(74) Attorney, Agent, or Firm — Abel Law Group, LLP; Robert N. Young (57) ABSTRACT

A scintillator pixel array can include a plurality of scintillator pixels and a plurality of voids arranged in a checkerboard pattern. Each void can be defined by at least two surfaces having an adhesive disposed thereon. The scintillator pixel array can be made by fabricating an array of scintillator members and dissolvable members and dissolving the dissolvable members in a solvent.

25 Claims, 9 Drawing Sheets

SCINTILLATOR PIXEL ARRAY

CROSS-REFERENCE TO RELATED APPLICATION

This application claims priority under 35 U.S.C. §119(e) to U.S. Patent Application No. 61/582,222 entitled "Scintillator Pixel Array," by Perna, filed Dec. 30, 2011, which is assigned to the current assignee hereof and incorporated herein by reference in its entirety.

BACKGROUND

1. Field of the Disclosure

The present disclosure is directed to scintillators, particularly to scintillator pixel arrays for radiation detectors.

2. Description of the Related Art

Scintillator pixel arrays have been employed in various applications that require non-destructive inspection of objects. For example, scintillator pixel arrays can be used within x-ray computed tomography imaging systems that are useful in medical applications for diagnosing and treating patients. Also, scintillator pixel arrays can be used within other x-ray computed tomography systems that are useful in security applications for looking inside luggage. Typically, a scintillator pixel array is installed in a detector adjacent to a photosensor array. The individual scintillator pixels are made of a scintillator material that is effective for detecting various types of radiation, including for example, x-rays. In general, a target is placed between an x-ray source and a detector. As the x-ray radiation passes through the target, the internal features of the target can cause the radiation to become attenuated. The level of attenuation can be determined based on the level of illumination provided by each scintillator pixel. The measured attenuation may be used to create images of the internal structure of the target.

In many instances, manufacturing a scintillator pixel array can require a substantial amount of time. Further, the manufacturing process can require the use of relatively complicated fixtures, or tools, during assembly.

Accordingly, the industry continues to need improvements in scintillator pixel arrays, particularly scintillator pixel arrays that require less time and less tooling to assemble.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description is directed to scintillator pixel arrays, and particularly, to scintillator pixel arrays that can be used in conjunction with x-ray scanner systems. For example, the scintillator pixel array can be part of a computed tomography system that can be used for medical imaging. Also, the scintillator pixel array may be used with other x-ray scanner systems, such as airport security scanners and x-ray systems used for non-destructive inspection of particular goods.

A soluble crystalline material, e.g., water soluble salt material, can be used to form voids in between adjacent scintillator pixels. The soluble material can be formed into dissolvable plates, e.g., salt plates. Further, the dissolvable plates can be alternatingly disposed between plates comprising a scintillator material. After the dissolvable plates and scintillator plates are assembled into a block, the block may be cut into plates that alternatingly include parallelepipeds, or square columns, of dissolvable material and scintillator material. Every other scintillator/dissolvable plate within the group of scintillator/dissolvable plates formed from the block of salt plates and scintillator plates can be rotated 180°. Thereafter, the scintillator/dissolvable plates may be reassembled into a block having a checkerboard pattern of scintillator material and salt material. This scintillator/dissolvable block can be cut into plates of scintillator material and salt material arranged in a checkerboard pattern. Once the scintillator/dissolvable checkerboard plates are assembled, the plates can be exposed to a solvent in order to remove the soluble material and form voids in between adjacent parallelepipeds, or square columns, of scintillator material.

According to an aspect, each scintillator pixel within the scintillator pixel array includes a scintillator material such as, a scintillator crystal. The scintillator material can be sensitive to particular types of radiation, for example, X-rays, gamma rays, etc. such that when the material captures a particular type of radiation, the scintillator material responds by fluorescing or scintillating electromagnetic radiation at a particular wavelength. The fluoresced radiation can be converted to an electronic pulse by a photosensor, such as a photomultiplier tube, photodiode, or an array thereof, which converts the fluoresced radiation to electrical signals for processing. As such, the scintillator pixel array in conjunction with a photosensor array can provide a user with the ability to detect and record radiation events, which in the context of computed tomography, can enable users to create images useful for diagnosing and treating patients.

Figure 1:
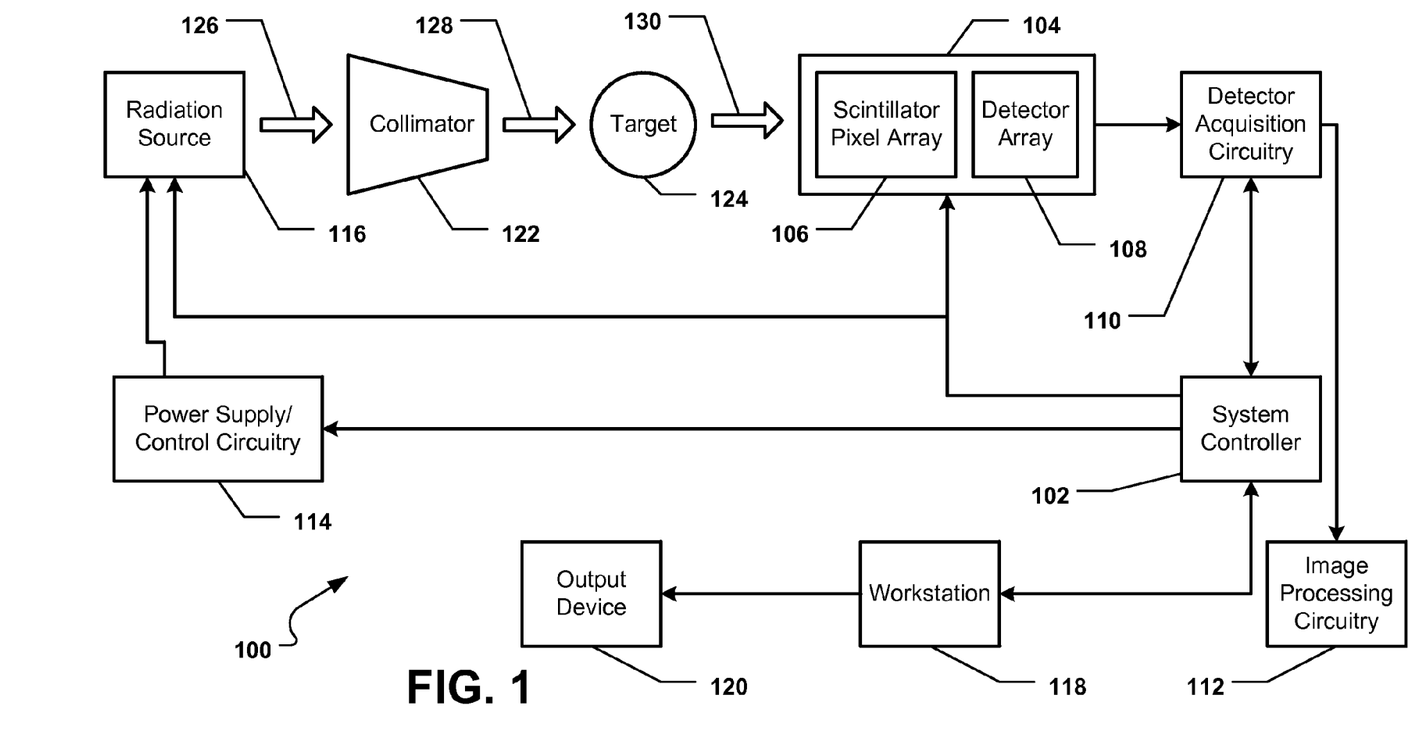
FIG. 1 includes a diagram of an x-ray computed tomography system in accordance with an embodiment.

FIG. 1 illustrates an exemplary x-ray computed tomography imaging system, generally designated 100. In a particular embodiment, the imaging system 100 can include a system controller 102. A radiation detector 104 can be coupled to the controller 102. In a particular aspect, the radiation detector 104 can include a scintillator pixel array 106 and a detector array 108 contained within a housing (not illustrated). Details concerning the construction of the scintillator pixel array 106 are described below in conjunction with FIG. 2 through FIG. 8. A skilled artisan will recognize that the detector array 108 can include an array of photosensors (not illustrated) arranged so that each photosensor is adjacent to a corresponding scintillator pixel (described below).

As depicted in FIG. 1, detector acquisition circuitry 110 can be coupled to the radiation detector 104, and image processing circuitry 112 can be coupled to the detector acquisition circuitry 110. FIG. 1 further illustrates that a power supply/control circuitry 114 can be coupled to the system controller 102. Further, a radiation source 116 can be coupled to the power supply/control circuitry 114, the system controller 102, and the radiation detector 104. A workstation 118 can be coupled to the system controller 102, and an output device 120 may be coupled to the workstation 118. Moreover, as illustrated, a collimator 122 may be positioned between the radiation source 116 and the radiation detector 104. A target 124 may be positioned between the collimator 122 and the radiation detector 104.

During operation, the radiation source 116 can emit radiation 116 toward the collimator 122 and the collimator 122 can collimate the radiation 116 as collimated beams 128. In certain embodiments, the radiation may be x-ray radiation, beta radiation, or gamma radiation. The collimated beams 128 of radiation 116 can be directed toward the target 124. In a particular aspect, the target 124 can be an animal, a human, baggage, a vehicle, a cargo container, an object, or any other target having internal features or contents. A portion of the radiation 116 can pass through the target 124 as attenuated radiation 130. More specifically, internal features of the target 124 can at least partially reduce the intensity of the collimated beams 128 of radiation 126. For example, one internal feature may pass more or less radiation than another internal feature. In turn, attenuated radiation 130 can impinge the radiation detector 104, specifically the scintillator pixels (described below) within the radiation detector 104. Each of the scintillator pixels can become illuminated to varying degrees of brightness based on the extent of attenuation. Corresponding photosensors (e.g., photodiodes) within the detector array can convert the light detected from the scintillator pixels into electrical signals. The system 100 can process these electrical signals to construct an image of the internal features within the target 124. In another aspect, the radiation source may be present within the target 124 and the radiation detector 104 can detect the presence of the radiation within the target 124.

In a particular aspect, the radiation source 116 can be controlled by the power supply/control circuit 114, which can provide power and control signals for examination sequences. The detector acquisition circuitry 110 can control acquisition of the signals generated in the radiation detector 104. The power supply/control circuit 114 can be responsive to signals from the system controller 102. Moreover, the system controller 102 can generally control operation of the imaging processing circuitry 112 to execute examination protocols and to process acquired image data.

The workstation 118 can be used as a user interface to the system 100. For example, the workstation 118 can be used for outputting system parameters, requesting examination, viewing images, and so forth. The workstation 118 can be configured to enable an operator, via one or more input devices (keyboard, mouse, touchpad, etc.), to control the operation of the system controller 102 and, if necessary, other components of the system 100. The output device 120 can include a display, a printer, a persistent memory or a combination thereof that can be used to output images generated during operation of the system 100.

In general, displays, printers, operator workstations, and similar devices may be local or remote from the system 100. For example, these interface devices may be positioned in one or more places within an institution or hospital, or in an entirely different location. As such, the interfaces devices may be linked to the image system 100 via one or more configurable networks, such as the internet, virtual private networks, and so forth. These and other input/output devices or interfaces may be incorporated into the imaging system 100 in accordance with embodiments of the present technique.

In a particular embodiment, the electronics within the detector acquisition circuitry 110, the system controller 102, or a combination thereof can include one or more electronic devices, such as an amplifier, a pre-amplifier, a discriminator, an analog-to-digital signal converter, a photon counter, another electronic device, or any combination thereof.

Further, in one embodiment, the photosensors (not illustrated) within the detector array 108 can include a device capable of spectral detection and resolution. For example, each of the photosensors can include a conventional photomultiplier tube (PMT), a photodiode, or a hybrid photosensor.

Figure 2:
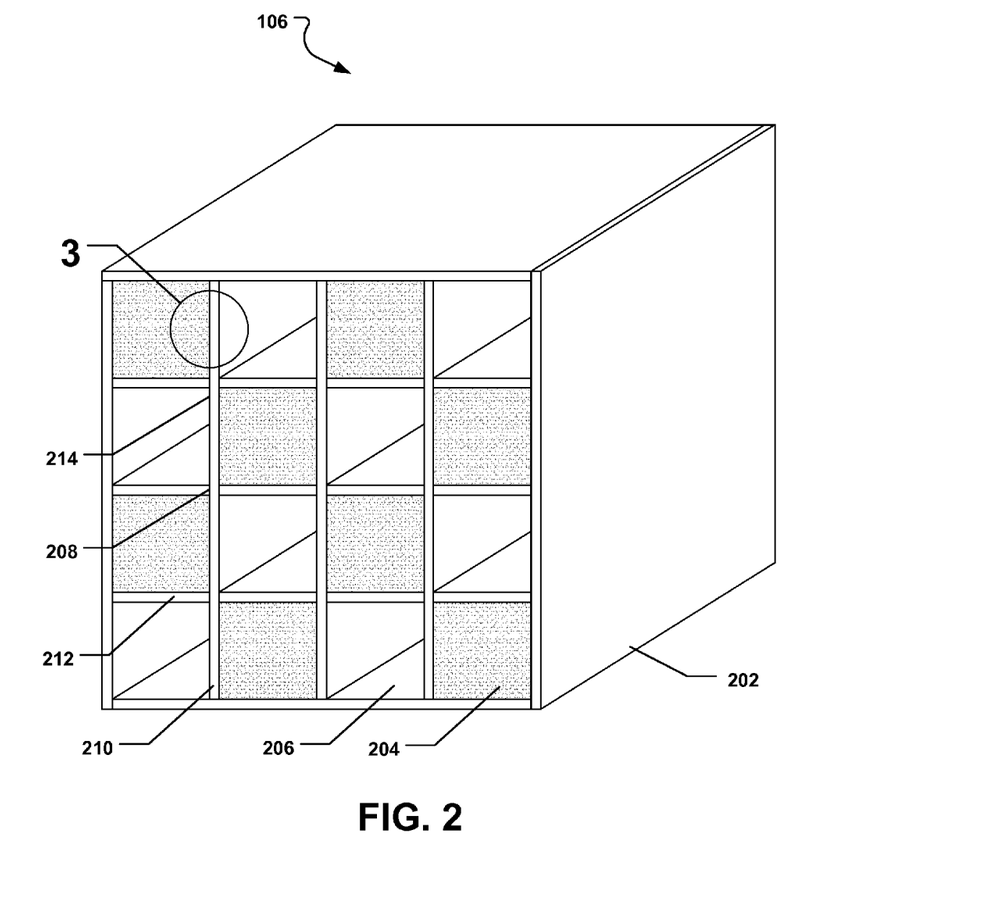
FIG. 2 includes a perspective view of a scintillator pixel array in accordance with an embodiment.

Referring to FIG. 2, details concerning the scintillator pixel array 106 are illustrated. As depicted, the scintillator pixel array 106 can include a housing 202. The housing 202 can be constructed from a metal material, such as aluminum, steel, etc. Further, the housing 202 can be constructed from a plastic material, such as an epoxy material. In particular, the housing 202 can be constructed from a white plastic material having reflective properties.

A plurality of scintillator pixels 204 can be disposed within the housing 202. Each scintillator pixel 204 can include a scintillator material. In accordance with an embodiment, the scintillator material can be a material including an inorganic material, an organic material, or a combination thereof. In more particular instances, the scintillator material can be an inorganic material including, for example, a halide, an oxide, or a combination thereof. In one particular instance, the scintillator material can be a crystalline, inorganic material. Certain crystalline, inorganic materials can include rare-earth elements.

Embodiments herein can utilize a detector incorporating a scintillator material made of a crystalline inorganic material, such as BGO (e.g., $Bi_4Ge_3O_{12}$), LYSO (e.g., $Lu_{1.8}Y_{0.2}SiO_5$), LSO (e.g., $Lu_2SiO_5$), $LuI_3$, GSO (e.g., $Gd_2SiO_5$), CLYC (e.g., $Cs_2LiYCl_6$), CNLI (e.g., $Cs_2NaLaI_6$), CLLB (e.g., $Cs_2LiLaBr_6$), LuAP (e.g., $LuAlO_3$), LuYAO (e.g., $Lu_xY_{1-x}AlO_3$), LuAG (e.g., $Lu_3Al_5O_{12}$), $Lu_2Si_2O_7$, $GdI_3$, $SrI_2$, LGSO (e.g., $Lu_{1.8}Gd_{0.2}SiO_5$) GYSO (e.g., $GdYSiO_5$), LGYSO and combinations thereof.

Skilled artisans will appreciate that the foregoing crystalline, inorganic materials can include dopants, which can be present as elemental species in minor amounts within the compound. Further, skilled artisans will appreciate that certain of the foregoing crystalline, inorganic materials may be water soluble, others may be hydrocarbon soluble, others may be water soluble and hydrocarbon soluble, others may be soluble when exposed to another solution or vapor, and still others may not be soluble.

In other embodiments, the scintillator material can include an organic material. For example, suitable organic materials can include polymer materials. In certain instances, the scintillator material can incorporate a combination of inorganic and organic materials, such as any of the organic materials utilized above in combination with a polymer material.

Returning to the description of FIG. 2, the scintillator pixel array 106 can also include a plurality of voids 206 formed within the housing 202. Each void 206 can be located between adjacent scintillator pixels 204. Specifically, as illustrated in FIG. 2, the scintillator pixels 204 and the voids 206 can be arranged in a checkerboard pattern having rows of alternating scintillator pixels 204 and voids 206. In a particular aspect, each scintillator pixel 204 and each void 206 are substantially identically shaped. For example, each scintillator pixel 204 and each void 206 are parallelepipeds having square cross-sections.

Further, each scintillator pixel 204 and each void 206 can have a width, a height, and a length (into the page at FIG. 2). In a particular aspect, the width and the height of each scintillator pixel 204 and each void 206 are substantially the same. Further, each scintillator pixel 204 and each void 206 is substantially identically sized. In a particular embodiment, the width and the height can be at least about 1.0 mm (0.04 inches). More specifically, the width and the height can be at least about 2.0 mm (0.08 inches), such as at least about 3.0 mm (0.12 inches) at least about 4.0 mm (0.16 inches), at least about 5.0 mm (0.2 inches), at least about 6.0 mm (0.24 inches), at least about 7.0 mm (0.28 inches), at least about 8.0 mm (0.32 inches), at least about 9.0 mm (0.35 inches), or at least about 10.0 mm (0.39 inches). In a particular aspect, the width and the height may be no greater than about 15.0 mm (0.6 inches).

In one aspect, the scintillator pixels 204 and the voids 206 can be cubes. As such, the length of each scintillator pixel 204 and each void 206 can be substantially the same as the width and the height of each scintillator pixel 204 and each void 206. In another aspect, the length of each scintillator pixel 204 and each void 206 can be at least about 12.7 mm (0.5 inches). Further, the length of each scintillator pixel 204 and each void 204 can be at least about 19.1 mm (0.75 inches), such as at least about 25.4 mm (1.0 inches), at least about 31.8 mm (1.25 inches), at least about 38.1 mm (1.5 inches), at least about 50.8 mm (2.0 inches), at least about 63.5 mm (2.5 inches), at least about 76.2 mm (3.0 inches), at least about 88.9 mm (3.5 inches), at least about 101.6 mm (4.0 inches), at least about 114.3 mm (4.5 inches), or at least about 125.0 mm (5.0 inches). In another aspect, the length of each scintillator pixel 204 and each void 206 is not greater than about 254.0 mm (10.0 inches).

As further depicted in FIG. 2, the scintillator pixel array 106 can include a grid 208 that provides structural support for the scintillator pixels 204 and maintains the scintillator pixels 204 within the checkerboard pattern. In a particular aspect, the grid 208 can be formed from septa material that is used during the construction of the scintillator pixel array 106, described in detail below in conjunction with FIG. 4. In a particular aspect, the septa material can include a plastic, such as a polymer. Further, the septa material can include a reflective plastic, such as a reflective white plastic. In another aspect, the septa material can include a metal. For example, the septa material can include lead. Moreover, the septa material can include aluminum, such as an aluminum foil. In still another aspect, the septa material can include a composite material. For example, the septa material can include a lead/plastic composite material. The septa can also include tungsten, tantalum, heavy met, or a combination thereof.

In a particular aspect, the grid 208 can include a plurality of longitudinal walls 210 that extend along the entire length of each column of scintillator pixels 204 and voids 206. Further, the grid 208 can include a plurality of lateral walls 212 that separate each adjacent scintillator pixel 204 and void 206 within each column of scintillator pixels 204 and voids 206. Each lateral wall 212 extends along a width of a scintillator pixel 204 or a void 206. A height of each longitudinal wall 210 can be substantially the same as a height of an adjacent column of scintillator pixels 204 and voids 206. Further, a width of each lateral wall 212 is substantially the same as a width of each adjacent scintillator pixel 204 and void 206.

Each of the longitudinal walls 210 and lateral walls 212 are arranged to establish a plurality of cells 214 within the grid 208. Depending on a location within the grid 208, each cell 214 can be space defined by two grid surfaces (corner location), three grid surfaces (edge location), or four grid surfaces (interior location). Moreover, each cell 214 can be substantially a scintillator pixel 204 or a void 206. In the embodiment as illustrated, for interior locations, all sides of the scintillator pixel 204 can be adjacent to voids 206, and each all sides of the void 206 can be adjacent to scintillator pixels 204.

Each of the longitudinal walls 210 and laterals walls 212 comprising the grid 208 can have a wall thickness. In a particular aspect, the wall thickness for each longitudinal wall 210 and each lateral wall 212 is substantially the same. For example, the wall thickness can be at least about 0.025 mm (0.001 inches). Further, the wall thickness can be at least about 0.05 mm (0.002 inches), such as at least about 0.1 mm (0.004 inches), at least about 0.5 mm (0.02 inches), at least about 1.0 mm (0.04 inches), at least about 1.25 mm (0.05 inches), at least about 1.5 mm (0.06 inches), at least about 1.75 mm (0.07 inches), or at least about 2.0 mm (0.08 inches). In another aspect, the wall thickness is not greater than about 2.5 mm (0.1 inches).

Figure 3:
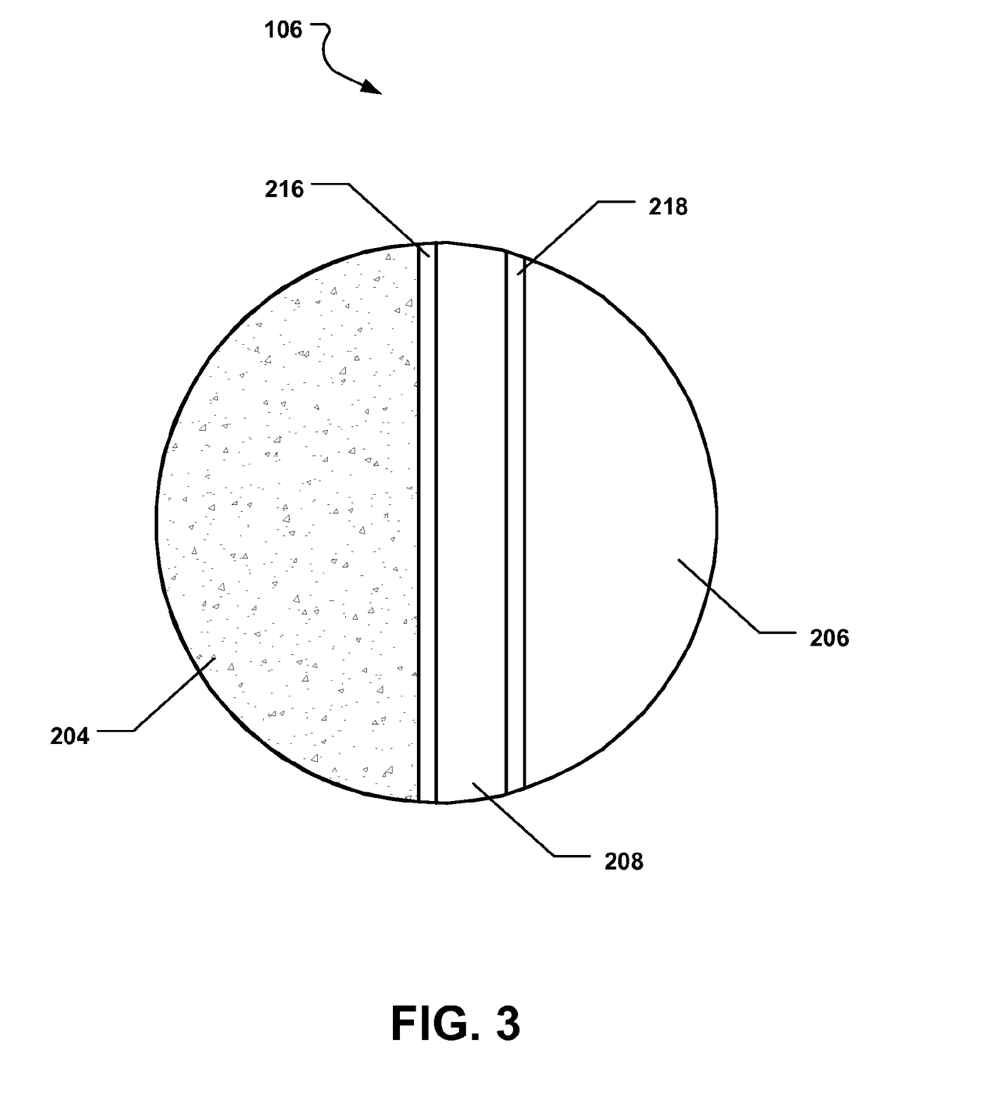
FIG. 3 includes a detailed view of a scintillator pixel array in accordance with an embodiment taken at Circle 3 in FIG. 2.

FIG. 3 depicts a close-up view of the scintillator pixel array 106 taken at Circle 3 in FIG. 2. FIG. 3 illustrates details concerning a pixel-grid interface and a grid-void interface. As indicated in FIG. 3, the grid 208 may be coated with a first adhesive 216 between the grid 208 and each scintillator pixel 204. In particular, each scintillator pixel 204 can be coupled to the grid 208 with the first adhesive 216.

Further, the grid 208 may be coated with a second adhesive 218 between the grid 208 and each void 206. As described in greater detail below, during the manufacturing process of the scintillator pixel array 106, each void 206 includes a square column of a soluble crystalline material, e.g., a salt material, before a final dissolution process removes the soluble crystalline material to form the voids 206. Each column of soluble material (not illustrated in FIG. 2) can be coupled to the grid in a manner similar to how each pixel 204 is coupled to the grid 208.

In a particular aspect, the first adhesive 216 and the second adhesive 218 can be substantially water resistant. In other words, the first adhesive 216 and the second adhesive 218 may not be dissolved when placed in water. As such, after the soluble crystalline material is dissolved from each void 206, the second adhesive 218 that formerly connected the column of the soluble crystalline material to the grid 208 remains. Moreover, as illustrated in FIG. 2, each void 206 can be at least partially defined, or enclosed, by a grid surface that is substantially coated with the second adhesive 218. In a particular aspect, the adhesive 218 can include silicone, epoxy, or double-sided pressure sensitive tape (film).

In a particular aspect, the grid surfaces around each void 206 can include an adhesive coverage area. The adhesive coverage area can be expressed as a percentage of total surface area of the grid surfaces around each void 206 that is coated, or covered, with the second adhesive 218. In a particular embodiment, the adhesive coverage area is at least about 70%. Further, the adhesive coverage area is at least about 75%, such as at least about 80%, at least about 85%, at least about 90%, at least about 95%, at least about 96%, at least about 97%, at least about 98%, or at least about 99%. Moreover, the adhesive coverage area can be about 100%.

In a particular embodiment, not all of the soluble crystalline material may be dissolved from within each void. For example, trace amounts of the soluble crystalline material can be found on the grid surfaces around each void 206. Specifically, if the soluble crystalline material comprises a salt, as described herein, ions of the salt, or the salt itself, may remain on any of the grid surfaces around each void 206. In a particular embodiment, the ions, or salt, may remain along exposed surfaces of the second adhesive 218. Further, the ions, or salt, may be found along the other side of the second adhesive 218. The likelihood of salt ions remaining on any of the grid surfaces around each void 206 can be increased if there is any residual static electricity in the septa material forming the grid 208.

In order to determine whether any salt ions remain on the grid surfaces around a void 206, a particular void 206 may be temporarily sealed at one end and filled with deionized water. The deionized water may be allowed to remain within the void 206 for a predetermined time period. Thereafter, the deionized water may be removed from the void 206 and tested for conductivity. A measured conductivity greater than 5.5 microseimens per meter ($\mu$S/m) would indicate the presence of ions within the deionized water. Those ions would be due to the trace amount of salt remaining on the grid surfaces around the void 206. Further, a concentration of remaining salt ions, or salt, may change substantially as measured into the second adhesive 218, i.e., at various distances from a surface of the second adhesive 218.

In another aspect, fillets of soluble material may remain after the dissolution process is complete. The fillets may serve to strengthen the pixel array 106. In a particular aspect, at least 1 vol % of the soluble material in each void may remain in the void. For example, at least 1 vol %, at least 2 vol %, at least 3 vol %, at least 4 vol %, or at least 5 vol % of the soluble material in each void may remain in the void. In another aspect, no greater than 10%, no greater than 9%, no greater than 8%, or no greater than 7% of the soluble material in each void may remain the void. The remaining material may be within a range between and including the minimum and maximum percentage values described herein.

Figure 4:
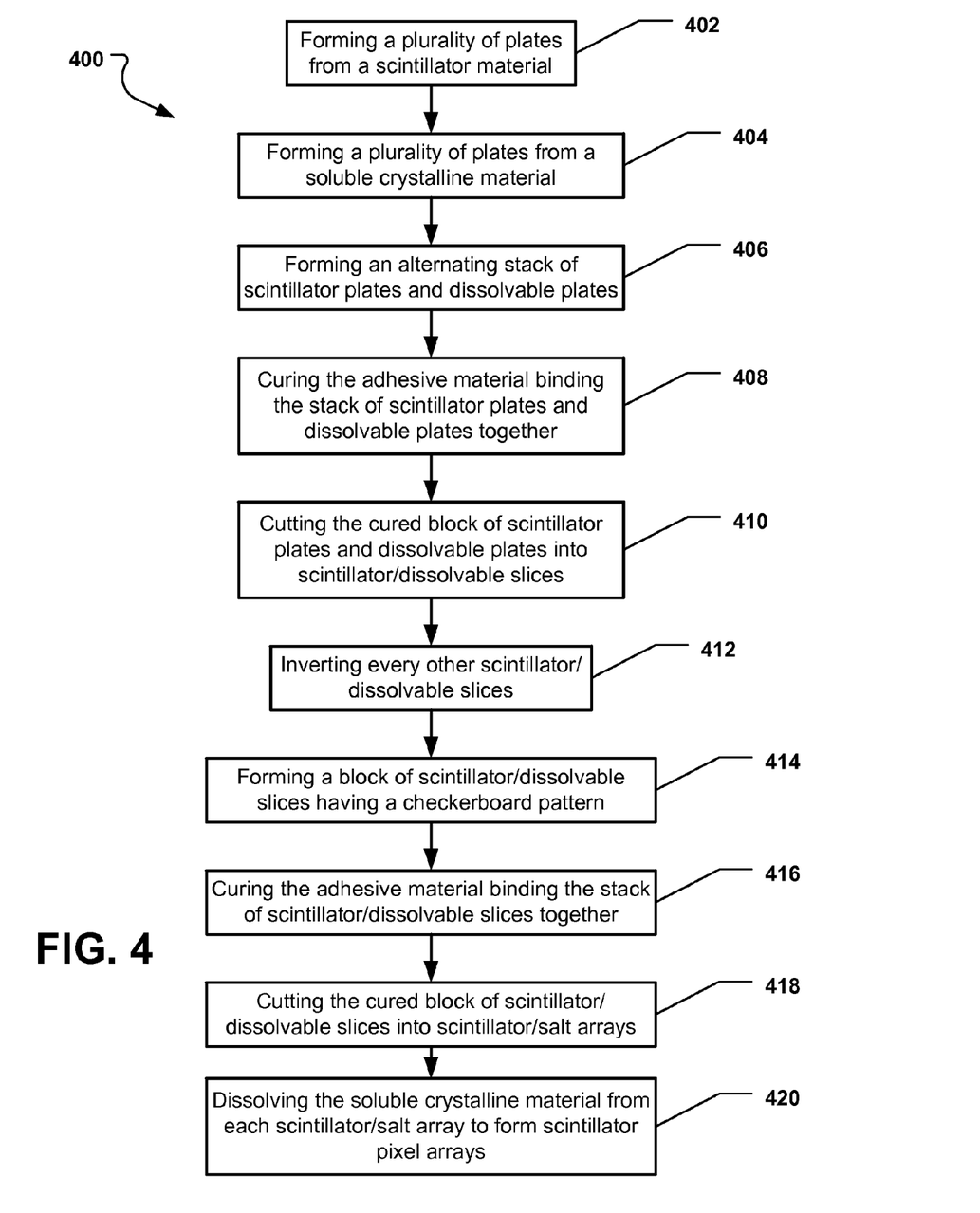
FIG. 4 includes a flow chart illustrating a method of making a scintillator pixel array in accordance with an embodiment.

Referring now to FIG. 4, a method of making a scintillator pixel array is illustrated and is generally designated 400. Beginning at block 402, the method 400 can include forming a plurality of plates from a scintillator material. The scintillator material can be one or more of the scintillator materials described herein. Further, a skilled artisan can appreciate that depending on the application a portion of the scintillator plates may be made from a first scintillator material and another portion of the scintillator plates may be made from a different scintillator material.

Returning to the description of FIG. 4, at block 404, the method 400 can include forming a plurality of dissolvable plates from a soluble crystalline material. The soluble material can include an alkali halide material. The alkali halide material can include a material formed from a reaction between an alkali metal and a halogen. The alkali metal can include lithium, sodium, potassium, rubidium, or cesium. The halogen can include fluorine, chorine, bromine, or iodine. In a particular embodiment, the alkali halide material can include sodium chloride, sodium iodide, potassium chloride, or cesium iodide. Further, a skilled artisan can appreciate that depending on the application a portion of the salt plates may be made from a first salt material and another portion of the salt plates may be made from a second salt material. A skilled artisan will appreciate that the scintillator plates, the salt plates, or a combination thereof may be cut from larger blocks of material and machined, milled, polished, etc. to the proper dimensional tolerances.

Figure 5:
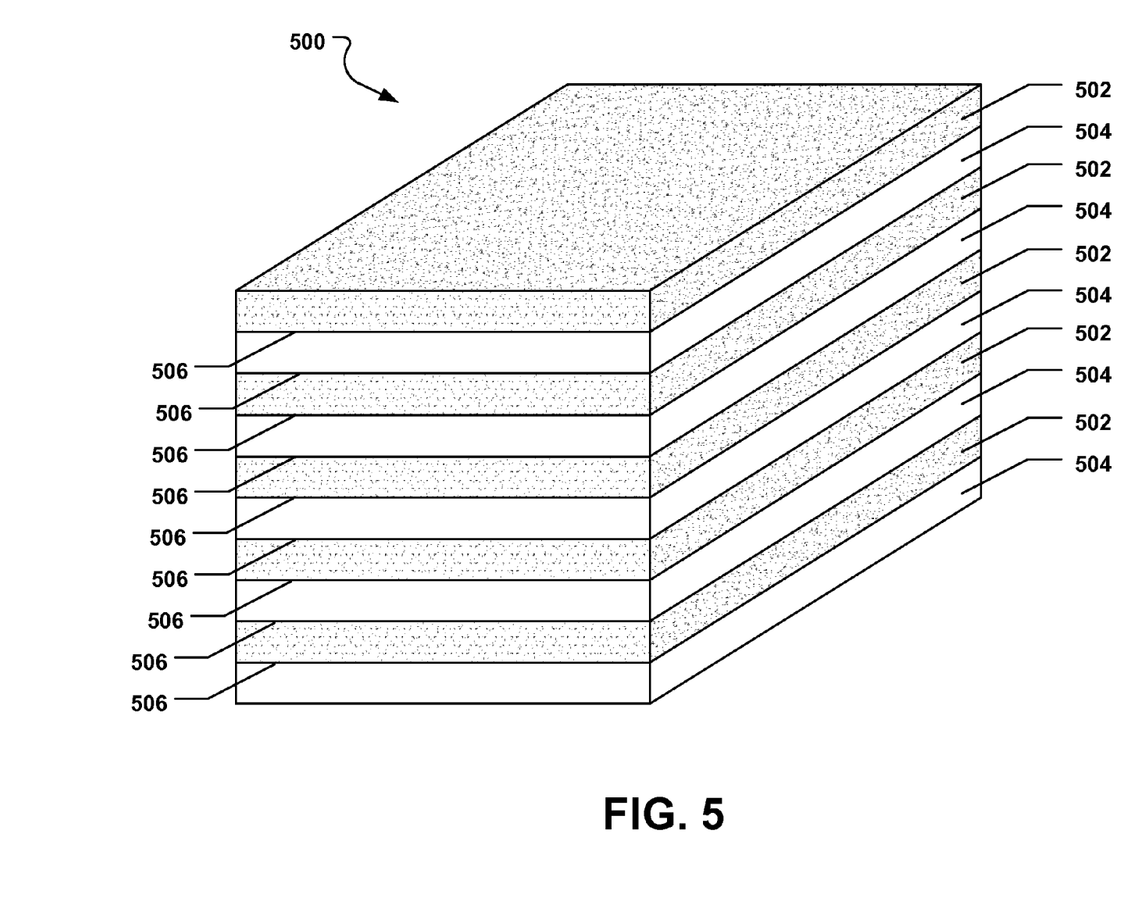
FIG. 5 includes a perspective view of a block alternately formed from a plurality of scintillator plates and a plurality of salt plates in accordance with an embodiment.
Figure 6:
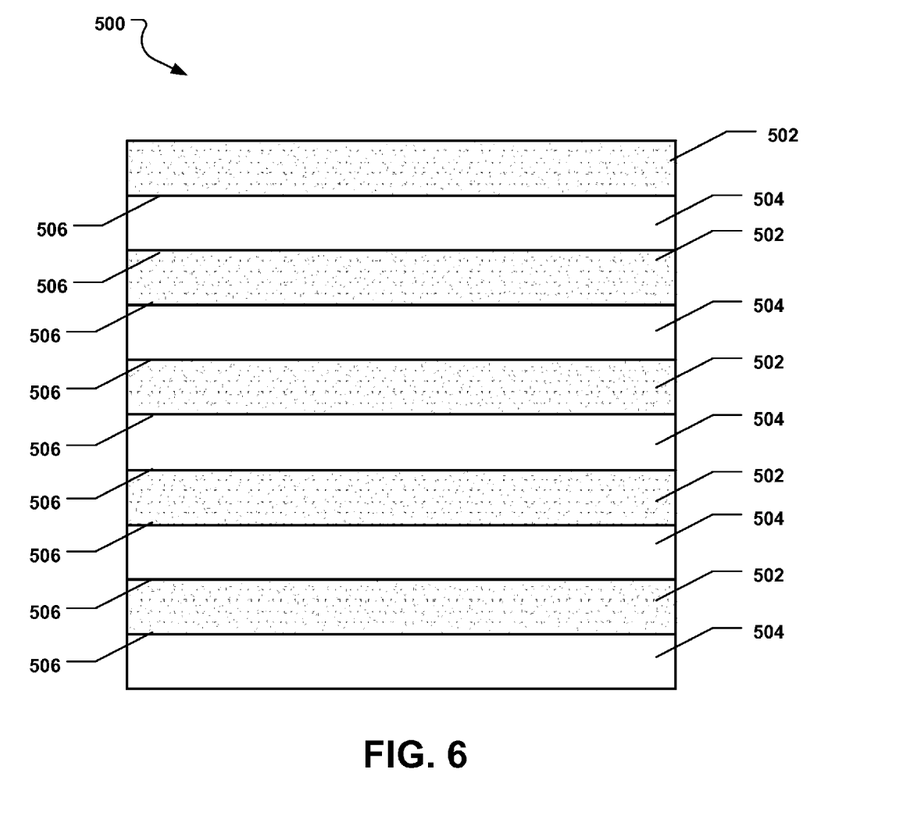
FIG. 6 includes a planar view of a block alternately formed from a plurality of scintillator plates and a plurality of salt plates in accordance with an embodiment.

At block 406, the method 400 can include forming an alternating block, or stack, of scintillator plates and dissolvable plates. FIG. 5 and FIG. 6 illustrated an exemplary stack, or block, designated 500. As depicted in FIG. 5 and FIG. 6, the block 500 includes a plurality of scintillator plates 502 and a plurality of dissolvable plates 504. A first adhesive layer (not illustrated), a septum 506, and a second adhesive layer (not illustrated) can be installed, or otherwise disposed, between each adjacent plate 502, 504. The adhesive layers may include one or more of the adhesives described herein. Further, the septa 506 may include one or more of the septa materials described herein and not all of the individual septum may be the same material.

Continuing to block 408, the method 400 can include curing the adhesive material that binds the stack of scintillator plates, septa, and dissolvable plates together to form a block. A skilled artisan will appreciate that the adhesive material may be cured by exposing the adhesive to visible light, ultraviolet light, infrared radiation (heat), or a combination thereof.

After curing is complete, the method 400 can include cutting the cured block of scintillator plates and dissolvable plates into individual scintillator/dissolvable slices at block 410. The block of scintillator plates and dissolvable plates can be cut using a wire saw, a band, saw, a laser, diamond wire saw, a diamond wire reciprocating saw, a reciprocating diamond coated band, or another suitable cutting tool. Further, to remove surface defects caused by the cutting operation, the plates can be ground, milled, machined, polished, etc.

Figure 7:
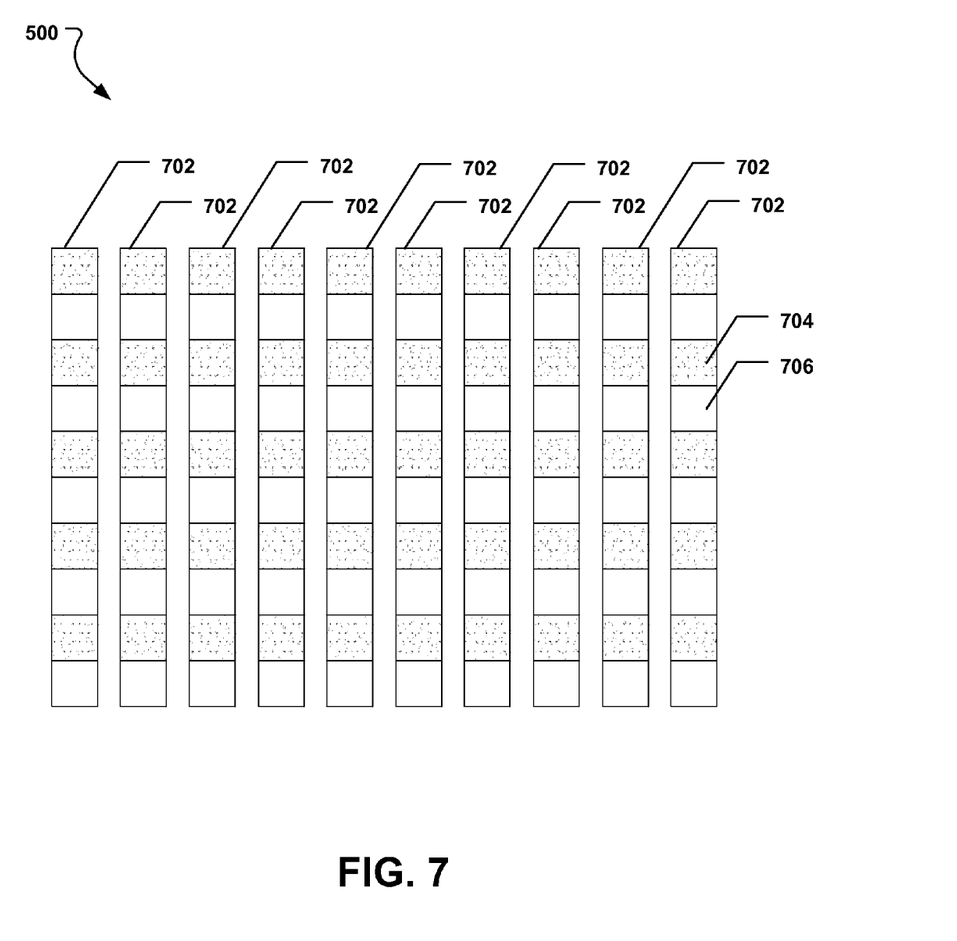
FIG. 7 includes a planar view of a plurality of scintillator/dissolvable plates cut from a block alternately formed from a plurality of scintillator plates and a plurality of salt plates in accordance with an embodiment.

FIG. 7 illustrates a block 500 that has been cut into scintillator/dissolvable slices 702. The scintillator/dissolvable slices 702 can include alternating square columns of a scintillator material 704 and dissolvable material 706.

Figure 8:
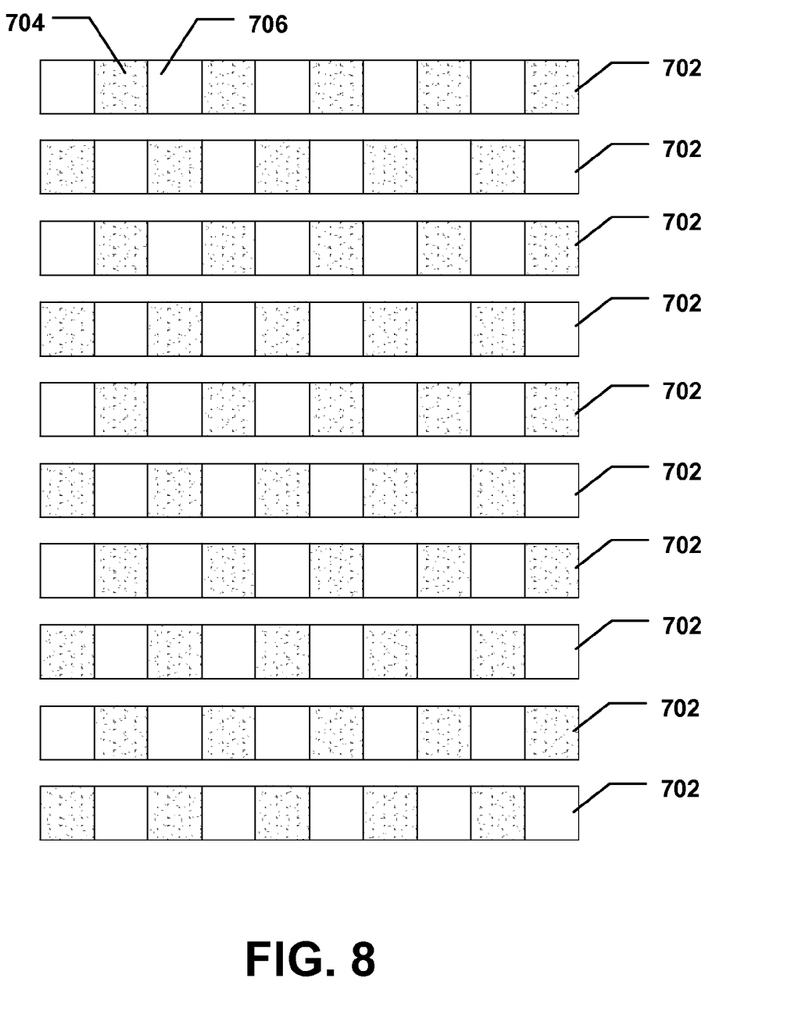
FIG. 8 includes a planar view of a plurality of scintillator/dissolvable plates in which every other scintillator/dissolvable plate is rotated 180° in accordance with an embodiment.
Figure 9:
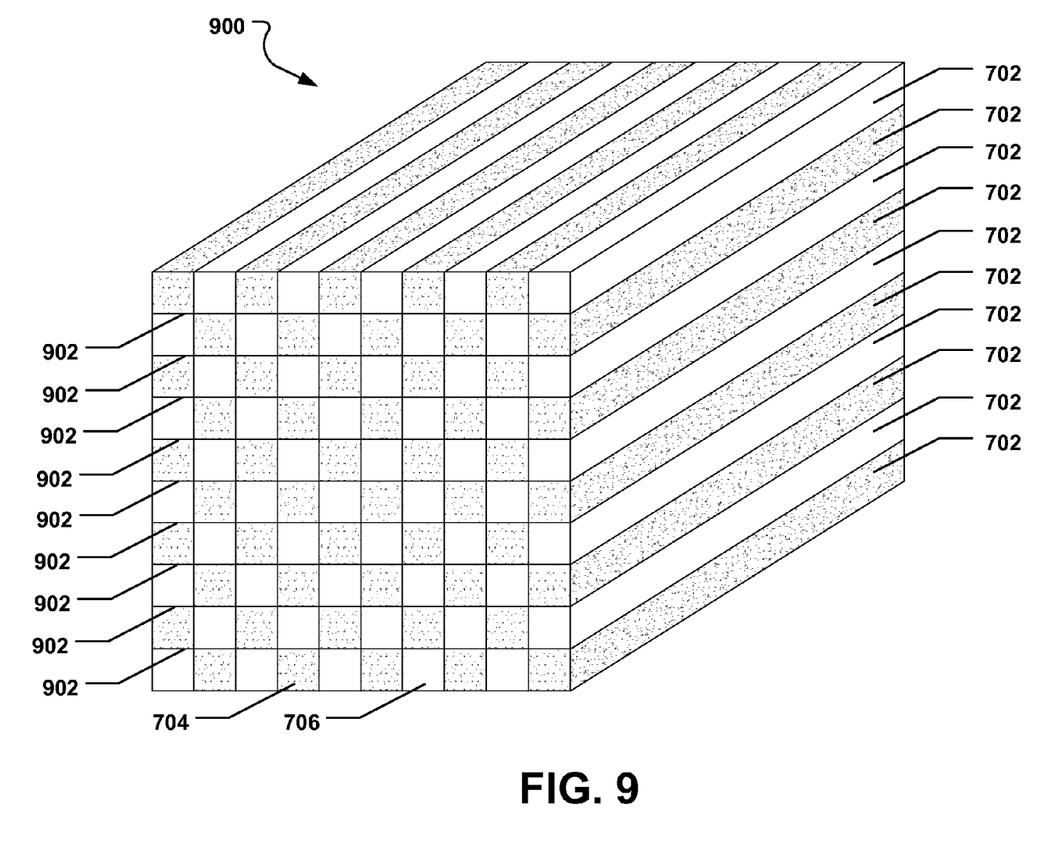
FIG. 9 includes a perspective view of a block formed a plurality of scintillator/dissolvable plates in which every other scintillator/dissolvable plate is rotated 180° in accordance with an embodiment.

Returning to the description of FIG. 4, at block 412, the method 400 can include inverting every other scintillator/dissolvable slice, as indicated in FIG. 8. Thereafter, at block 414, the method 400 can include forming a block of scintillator/dissolvable slices having a checkerboard pattern. FIG. 9 depicts a block 900 that has been formed from a plurality of scintillator/dissolvable slices 702. A first adhesive layer (not illustrated), a septum 902, and a second adhesive layer (not illustrated) can be installed, or otherwise disposed, between each adjacent plate 702. The adhesive layers may include one or more of the adhesives described herein. Further, the septa 902 may include one or more of the septa materials described herein and not all of the individual septum may be the same material. FIG. 9 shows that the block 902 includes a checkerboard pattern formed by a plurality of square columns of scintillator material 704 and a plurality of square columns of salt material 706.

Returning to the description of FIG. 4, the method 400 can include curing the adhesive material binding the stack of scintillator/dissolvable slices together at block 416. The adhesive may be cured using one of the curing methods described herein. Proceeding to block 418, the method 400 can include cutting the cured block of scintillator/dissolvable slices into scintillator/dissolvable arrays. Depending on the application, the scintillator/dissolvable arrays can be cut to a variety of different lengths. Examples of lengths are discussed above in conjunction with the description of the lengths of the scintillator pixels illustrated in FIG. 2.

Thereafter, at block 410, the method 400 can include dissolving the soluble crystalline material from each scintillator/dissolvable array to form scintillator pixel arrays. Dissolving the soluble crystalline material can include soaking the scintillator/dissolvable array in water until the soluble crystalline material is substantially dissolved from the scintillator/dissolvable array.

The system and method disclosed herein provides a relatively simple way to build a scintillator pixel array. Using the dissolvable plates to form columns of material between pixels to create a checkerboard pattern allows the scintillator material and dissolvable materials to be cut, machine, milled, polished, etc., during the manufacturing process. Further, the method disclosed herein can be used to create the scintillator pixel array without risking damage to individual pixels. For example, submerging a nearly completed array of scintillator pixels and salt columns to dissolve the salt results in very little, or no, physical damage to the remaining scintillator pixels. Scintillator pixel arrays having pixels of varying sizes can be manufactured quite readily.

A skilled artisan can recognize that there may be applications that require a checkerboard pattern of two types of scintillator pixels. Such an array can be manufactured using the same method described herein using scintillator plates made from a first scintillator material and scintillator plates made from a second scintillator material. However, the final dissolving step would be eliminated.

Although the scintillator pixel array 106 can be installed in an x-ray computed tomography imaging system 100 as illustrated in FIG. 1, skilled artisans can appreciate that the scintillator pixel array 106 can be used in other detectors. Further, the scintillator pixel array 106 may be made by fabricating an array scintillator members and dissolvable members and dissolving the dissolvable members in a solvent.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A detector device, comprising:
a photosensor array; and
a scintillator pixel array optically coupled to the photosensor, wherein the scintillator pixel array comprises:
a plurality of scintillator pixels and a plurality of voids, wherein the scintillator pixels and voids are arranged in a checkerboard pattern and wherein each void is defined by at least two grid surfaces having an adhesive disposed thereon.

2. The detector device of claim 1, wherein each grid surface around each void includes an adhesive coverage area that includes a percentage of total surface area of the grid surface that is coated with the adhesive and wherein the adhesive coverage area is at least about 70%.

3. The detector device of claim 1, wherein at least one of the grid surfaces surrounding the voids comprises a trace amount of a soluble material disposed therein.

4. The detector device of claim 3, wherein the soluble material comprises an alkali halide material.

5. The detector device of claim 1, further comprising a grid separating the scintillator pixels and the voids.

6. The detector device of claim 5, wherein the grid provides structural support for the scintillator pixels.

7. The detector device of claim 6, wherein the grid comprises a plurality of longitudinal walls and each longitudinal wall extends along a column of scintillator pixels and voids.

8. The detector device of claim 7, wherein each longitudinal wall has a height that is substantially equal to a height of the column of scintillator pixels and voids.

9. The detector device of claim 7, wherein the grid comprises a plurality of lateral walls and each lateral wall separates one of the scintillator pixels from one of the voids.

10. The detector device of claim 9, wherein each lateral wall has a width that is equal to a width of each of the scintillator pixels and a width of each of the voids.

11. The detector device of claim 1, wherein each scintillator pixel and each void is substantially identically sized.

12. The detector device of claim 1, wherein the detector device is configured for use in a computed tomography imaging system.

13. A scintillator pixel array comprising:
a housing;
a plurality of scintillator pixels within the housing; and
a plurality of voids within the housing, wherein each void is defined by at least two surfaces having an adhesive disposed thereon.

14. The scintillator pixel array of claim 13, wherein the scintillator pixels and voids are arranged in a checkerboard pattern.

15. The scintillator pixel array of claim 13, wherein the plurality of scintillator pixels and a plurality of voids are arranged in a checkerboard pattern, and wherein each void is defined by at least two surfaces having an adhesive disposed thereon.

16. A method of making a scintillator pixel array, the method comprising:
fabricating an array of scintillator members and dissolvable members; and
dissolving the dissolvable members in a solvent.

17. The method of claim 16 in which fabricating an array of scintillator members and dissolvable members comprises:

forming a first stack of scintillator plates and dissolvable plates, wherein each plate is bonded to at least one adjacent septum; and cutting the first stack into a plurality of scintillator/dissolvable slices having alternating columns of a scintillator material and a soluble crystalline material.

18. The method of claim 17, further comprising:
forming a second stack of scintillator/dissolvable slices, wherein each slice is bonded to at least one adjacent septum.

19. The method of claim 18, wherein the second stack comprises columns of a scintillator material and columns of a soluble crystalline material arranged in a checkerboard pattern.

20. The method of claim 18, further comprising:
dissolving a soluble crystalline material from the second stack.

21. The method of claim 20, wherein only a scintillator material, a septum material, and an adhesive material remains in the second block after the dissolving step.

22. The method of claim 17, further comprising:
inverting every other scintillator/dissolvable slice.

23. The method of claim 22, wherein every other scintillator/dissolvable slice is inverted by rotating 180°.

24. The method of claim 17, wherein each dissolvable plate comprises a soluble material.

25. The method of claim 24, wherein the soluble material comprises a soluble crystalline material.

\* \* \* \* \*

UNITED STATES PATENT AND TRADEMARK OFFICE
CERTIFICATE OF CORRECTION

| | | |
|---|---|---|
| PATENT NO. | : 8,866,089 B2 | Page 1 of 1 |
| APPLICATION NO. | : 13/712360 | |
| DATED | : October 21, 2014 | |
| INVENTOR(S) | : Louis Perna | |

It is certified that error appears in the above-identified patent and that said Letters Patent is hereby corrected as shown below:

In the claims

Column 10, line 36, please delete "of claim 7" and insert --of claim 6--

Signed and Sealed this
Fifteenth Day of March, 2016

Michelle K. Lee
*Director of the United States Patent and Trademark Office*